United States Patent [19]
Kaaden et al.

[11] Patent Number: 6,122,134
[45] Date of Patent: Sep. 19, 2000

[54] COMBINED LONGITUDINAL AND TRANSVERSAL TRACKING

[75] Inventors: Jurgen Kaaden; Klaus Oldermann, both of Villingen-Schwenningen; Peter Mahr, Konigsfeld; Gerhard Reiner, Villingen-Schwenningen, all of Germany; Bruno Weihs, Sevres, France

[73] Assignee: Deutsche Thomson-Brandt GmbH, Hannover, Germany

[21] Appl. No.: 08/990,761

[22] Filed: Dec. 15, 1997

[30] Foreign Application Priority Data

Dec. 20, 1996 [EP] European Pat. Off. .............. 96402854

[51] Int. Cl.$^7$ ...................................................... G11B 5/584
[52] U.S. Cl. ..................... 360/77.12; 360/48; 360/77.07; 360/77.08; 360/77.11
[58] Field of Search ............................. 360/77.12, 77.07, 360/77.11, 77.08, 77.01, 77.05, 77.02, 48

[56] References Cited

U.S. PATENT DOCUMENTS

| | | | |
|---|---|---|---|
| 3,691,543 | 9/1972 | Mueller | 360/77.02 |
| 3,812,533 | 5/1974 | Kimura et al. | 360/77.08 |
| 4,400,747 | 8/1983 | Siverling | 360/77.07 |
| 5,448,430 | 9/1995 | Bailey et al. | |

FOREIGN PATENT DOCUMENTS

| | | |
|---|---|---|
| 0 069 548 | 1/1983 | European Pat. Off. . |
| 0 082 645 | 6/1983 | European Pat. Off. . |
| 0 443 810 | 8/1991 | European Pat. Off. . |
| 0 569 610 | 11/1993 | European Pat. Off. . |
| 0 629 999 | 12/1994 | European Pat. Off. . |
| 7-192439 | 7/1995 | Japan . |
| WO 91/04555 | 4/1991 | WIPO . |

*Primary Examiner*—Paul Loomis
*Assistant Examiner*—Dan I. Davidson
*Attorney, Agent, or Firm*—Oblon, Spivak, McClelland, Maier & Neustadt, P.C.

[57] ABSTRACT

An information storage medium has at least a longitudinal bundle comprising three servo tracks (3, 4, 5). The bundle is arranged in consecutive tracking units (T(N)) of a determined longitudinal length. Surfaces of said servo tracks present either a first or a second characteristic (6, 7) and vary in size and distribution inside the tracking units. The bundles may contain longitudinally stored identification information. Methods for obtaining tracking signals indicating a transversal offset between a reading head and the bundle and for retrieving identification information are disclosed. Also methods for obtaining tracking units in which transversal tracking code is combined with distinct information are described.

5 Claims, 5 Drawing Sheets

COMBINED LONGITUDINAL AND TRANSVERSAL TRACKING

BACKGROUND OF THE INVENTION

The present invention relates to an information storage medium having at least a longitudinal bundle of three contiguous servo tracks. The invention further relates to methods for obtaining a tracking signal between a reading head and an information storage medium having at least a bundle of three contiguous servo tracks. The invention also relates to a method for obtaining a tracking code which combines a transversal tracking code with distinct longitudinal position and/or identification information.

It is known in the field of data storage on information storage media to store and use tracking information. As an example, the French patent FR 9215473 discloses an information storage medium carrying a multitude of adjoining longitudinal tracks which contain data. In a data storage and/or retrieval system used in conjunction with this information storage medium it may be necessary to perform transversal tracking to keep a writing and/or reading head aligned with the longitudinal tracks i.e. to detect transversal offset between the writing and/or reading head and the tracks. Transversal tracking information is combined with the data in the tracks by imposing special properties to a data coding. More specifically the data is coded in a way that in a track a digital sum value of the high and low bits making up the data results in a decreasing or increasing direct current (DC) component. Bundles of tracks having a decreasing DC-component alternate transversely with bundles of tracks having an increasing DC-component. The bundles may easily be detected during readout and the writing and/or reading head accordingly positioned with the precision of one trackwidth. In order to achieve an even more precise transversal positioning during readout a further method is used which consists in detecting crosstalk, i.e. monitoring to which extent data contained in two neighboring contiguous tracks contributes to one reading signal. Thus two crosstalk coefficients are computed for each track having two contiguous neighbouring tracks and variations of these crosstalk coefficients indicate transversal offset between the writing and/or reading head and the tracks.

In addition to transversal tracking it may also be necessary to perform longitudinal tracking to determine a longitudinal position on the track. Such longitudinal tracking is not described in FR 9215473.

It is the aim of the presentation to provide a solution for transversal tracking in which the processing of all data tracks as in prior art is not required. Additionally the present invention aims at finding a solution for combining longitudinal position information together with information needed for transversal tracking such that both may be retrieved using a same reading head.

SUMMARY OF THE INVENTION

According to the present invention the solution to the above mentioned problem is given by an information storage medium having at least a longitudinal bundle comprising a central servo track between two contiguous side servo tracks, said bundle being arranged in consecutive basic tracking units of a determined length. Each of said servo tracks has a surface presenting, at a given longitudinal position, either a first characteristic or a distinct second characteristic; inside a basic tracking unit a size of the surface presenting said first characteristic is smaller in one of said side servo tracks than in said central servo track, and in the other side servo track larger than in said central servo track.

Also accordingly to the present invention the above mentioned problem is solved by an information storage medium having at least a longitudinal bundle comprising a central servo track between two contiguous side servo tracks, said bundle being arranged in consecutive basic and complementary tracking units of a determined longitudinal length, said basic tracking units alternating with said complementary tracking units. Each of said servo tracks has a surface presenting, at a given longitudinal position, either a first characteristic or a distinct second characteristic. A size of the surface presenting said first characteristic inside a basic tracking unit is in one of said side servo tracks smaller then half of the size of an overall surface in said one side servo track and in the other side servo track larger than half of the size of an overall surface of said other side servo track. Inside a complementary tracking unit in each of said servo tracks a size of the surface presenting said second characteristic is the same as the size of the surface presenting said first characteristic inside the preceding basic tracking unit.

The information storage medium according to the invention may be of various natures. It may for example have a magnetizable surface in which case the surface presenting the first characteristic may be magnetized and the surface presenting the second characteristic may not. The information storage medium may also be a surface presenting either one of two distinct colors. The information storage medium may carry data which advantageously is writable and/or readable with a same head used to write and/or read the longitudinal bundle. The data will typically be stored in longitudinal tracks parallel to the bundle. The longitudinal tracks may be located on either transverse adjoining side of the bundle. The information storage medium may also have a plurality of longitudinal bundles. Accordingly it is possible to associate each bundle to specific data.

Also according to the invention a solution to the above mentioned problem is given by a method for obtaining a tracking signal between a reading head and an information storage medium, said information storage medium having at least a longitudinal bundle comprising a central servo track between two contiguous side servo tracks, said bundle being arranged in longitudinally consecutive tracking units of determined length, said method comprising the steps of; reading said central servo track over a tracking unit to obtain a reading signal, one of said side servo tracks contributing to said reading signal when said reading head is transversely offset from said servo track; integrating said reading signal over said tracking unit to obtain an integration result; comparing said integration result to a predetermined reference value to obtain said tracking signal. Said integration result is smaller than said reference value when said reading head is transversely offset in a first direction. It is greater than said reference value when said reading head is transversely offset in a second direction opposite to said first direction.

This method requires only a minimum of processing since only one track, the central servo track, is read and accordingly only one reading signal needs to be processed to obtain the tracking signal.

Another method for obtaining a tracking signal between a reading head and an information storage medium is found according to the invention to solve the above mentioned problem; said information storage medium has at least a longitudinal bundle comprising a central servo track between two contiguous side servo tracks, said bundle being arranged in longitudinally consecutive tracking units of determined length. The method comprises the steps of: reading all of said three servo tracks simultaneously over two consecutive tracking units, to obtain three reading signals, at least one of said two contiguous servo tracks contributing to one of said three reading signals when said reading head is transversely offset from said servo tracks; adding said three reading signals to obtain a total signal; integrating said total signal over said two consecutive tracking units while inverting the sign of said total signal for one of said two consecutive tracking units to obtain an integration result; comparing said integration result to a predetermined reference value to obtain said tracking signal. Said integration result is smaller than said reference value when said reading head is transversely offset in a first direction and greater than said reference value when said reading head is transversely offset in a second direction opposite to said first direction.

Furthermore, the above mentioned problem may be solved according to the invention using a method for obtaining a tracking code combining a transversal tracking code with distinct information. The tracking code is for use in an information storage medium having at least a longitudinal bundle comprising a central servo track between two contiguous side servo tracks, said bundle being arranged longitudinally in consecutive tracking units of a determined longitudinal length. Each of said servo tracks has a surface presenting, at a given longitudinal position, either a first characteristic or a second distinct characteristic. Said tracking code is represented in said bundle by using inside of each tracking unit and of each servo track a binary data codeword of high and low tracking bits, each of said high or low tracking bits being represented by a tracking bit surface having a fixed size and respectively presenting said first or said second characteristic, said binary data codewords all having a same total number of tracking bits. The method comprises the steps of selecting central binary data codewords having a same predetermined number of high tracking bits, said predetermined number being comprised between zero and said total number of tracking bits; coding said distinct information by using one or many combinations of two of said binary data codewords with any one of said central binary data codewords, a first of which has a number of high tracking bits smaller than said predetermined number, a second of which has a number of high tracking bits greater than said predetermined number; storing sequentially each of said combinations inside a tracking unit by storing said first codeword in a first of said side servo tracks, said central binary data codeword in said central servo track and said second codeword in a second of said side servo tracks.

This method enables many different combinations of binary data codewords with central binary data codewords containing the predetermined number of high tracking bits. A number of combinations achievable depends on the total number of tracking bits contained in a binary data codeword.

The answer to the above mentioned problem is according to the present invention also given by a method for obtaining a tracking code combining a transversal tracking code with distinct information for use in an information storage medium having at least a longitudinal bundle comprising a central servo track between two contiguous side servo tracks, said bundle being arranged longitudinally in consecutive tracking units of a determined longitudinal length. Each of said servo tracks has a surface presenting, at a given longitudinal position, either a first characteristic or a second distinct characteristic. The tracking code is represented in said bundle by using inside of each tracking unit and of each servo track a binary data codeword of high and low tracking bits, each of said high or low tracking bits being represented by a basic surface having a fixed size and respectively presenting said first or said second characteristic, said binary data codewords all having a same total number of tracking bits. The method comprises the steps of coding said distinct information by using one or many combinations of two of said binary data codewords with any special binary data codeword, one binary data codeword of which has a number of high tracking bits smaller than half of said total number of tracking bits, another of which has a number of high tracking bits greater than half of said total number of tracking bits; storing sequentially each of said combinations of binary data codewords in a pair of said tracking units, by storing inside one tracking unit of said pair said one codeword in a first of said side servo tracks, said special binary data codeword in said central servo track and said other binary data codeword in a second of said side servo tracks, and by storing inside the other tracking unit of said pair in each track a binary data codeword which has a number of low tracking bits equal to a number of high tracking bits in the binary data codewords stored in the corresponding track inside said one tracking unit.

There is no restriction on the choice of the special binary data codeword concerning the number of high tracking bits.

BRIEF DESCRIPTION OF THE DRAWINGS

Other characteristics and advantages of the invention will appear from the following description of several examples, made with reference to the appended FIGS. 1 to 9.

MORE DETAILED DESCRIPTION

The examples and figures are given by way of illustration only, and thus are not limitative of the present invention. Same reference numbers will be used to refer to the same items throughout the FIGS. 1 to 9.

Figure 1:
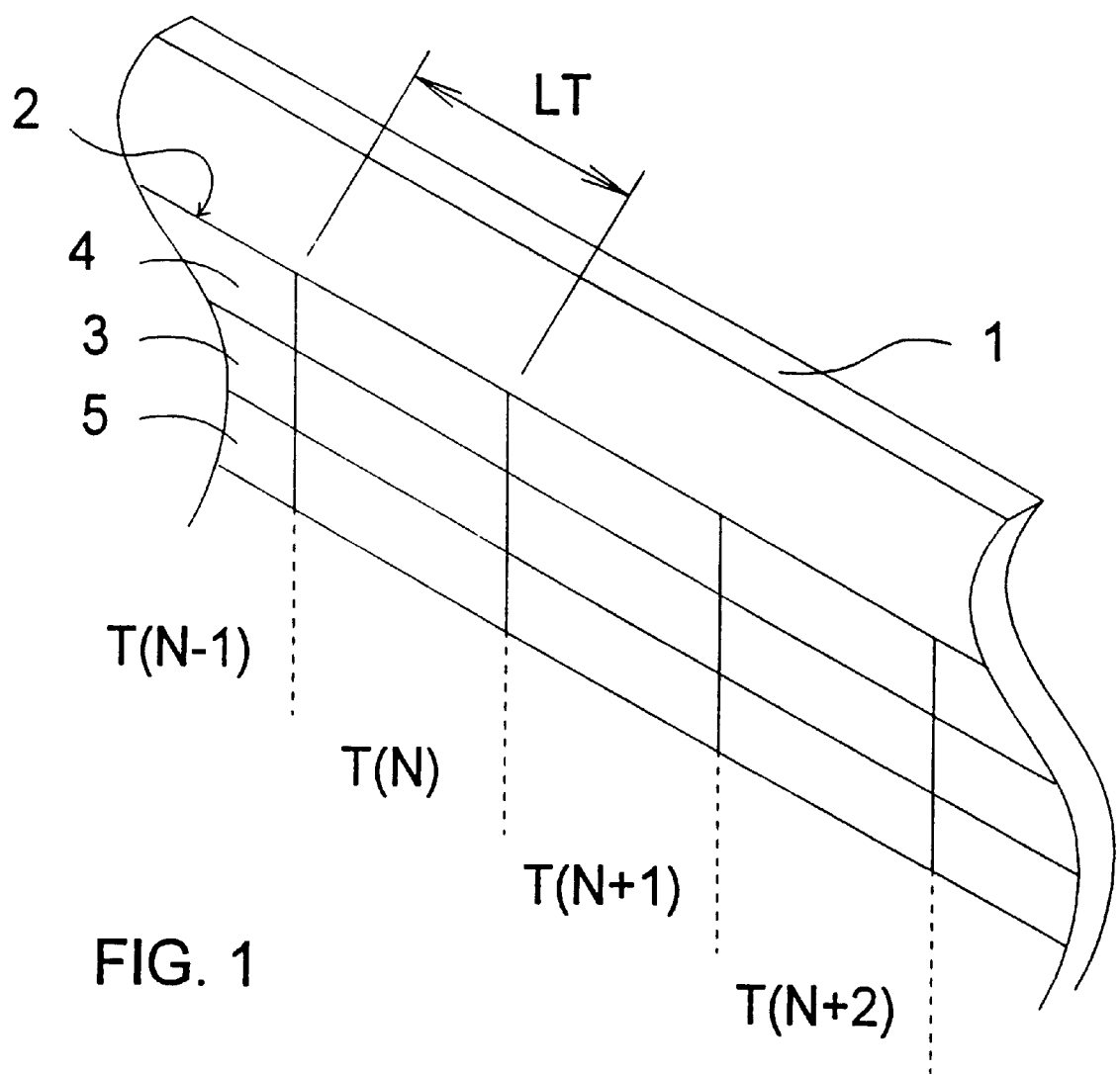
FIG. 1 contains a schematic representation of a portion of an information storage medium having a longitudinal bundle of servo tracks.

FIG. 1 shows a portion of an information storage medium 1. The information storage medium 1 has a longitudinal bundle 2 on a carrier surface and may also carry data (not shown) apart from the bundle 2. The bundle 2 comprises a central servo track 3 which is between two side servo tracks 4 and 5. The bundle 2 is arranged in consecutive basic tracking units T(N), N being an integer counting index to reference the tracking units. The basic tracking units T(N) have a determined longitudinal length LT. The portion of the information storage medium 1 may for example originate from a tape. It may also originate from any other object which has to be moved along a line parallel to the bundle 2.

Figure 2:
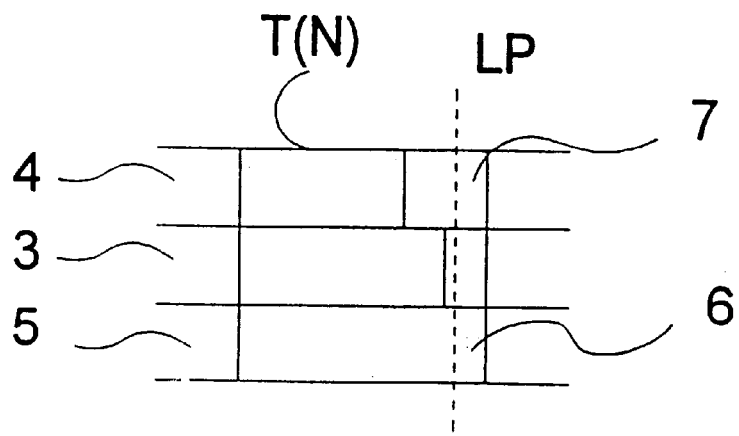
FIG. 2 contains a schematic representation of a basic tracking unit and surfaces presenting either a first or a second characteristic.

As can be seen in FIG. 2 which contains a representation of a single basic tracking unit T(N) each servo track 3, 4 and 5 has a surface which presents at a given longitudinal position, e.g. LP (shown in a dotted line), either a first characteristic 6 represented in dotted surfaces or a distinct second characteristic 7 represented by a plain white surface. As an example at the longitudinal position LP the side servo track 4 presents a surface with the second characteristic 7 and the side servo track 5 a surface with the first characteristic 6. Inside the basic tracking unit T(N) a size of the surface presenting the first characteristic 6 is smaller in the side servo track 4 than in the central servo track 3; it is larger in the side servo track 5 than in the central servo track 3. The first and second characteristic 6 and 7 depend on the nature of the information storage medium 1. The characteristics 6 and 7 must be distinct from each other, i.e. it must be possible to differentiate the first from the second characteristic. In case the information storage medium 1 is a magnetic tape the first characteristic 6 may be a certain magnetization value whereas the second characteristic 7 may be a different magnetization value.

Figure 3:
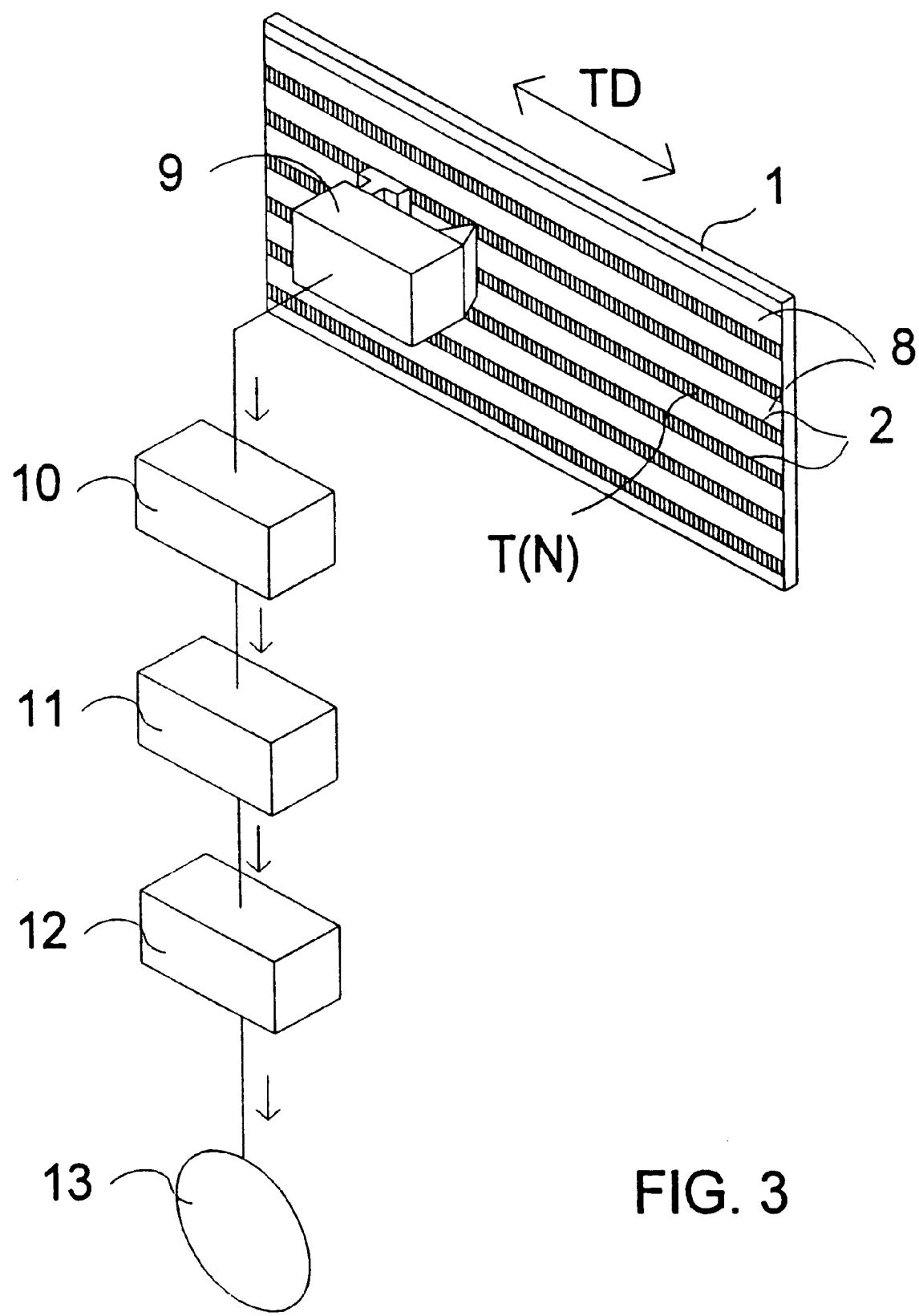
FIG. 3 contains a schematic representation of steps executed in a method for obtaining a tracking signal between a reading head and an information storage medium.

FIG. 3 shows an information storage medium 1 which has a multiplicity of longitudinal bundles 2. The bundles 2 are arranged in basic tracking units T(N), T(N+1). . . Spaces 8 between the bundles 2 may be occupied by data. The information storage medium 1 is moved relatively to a writing and/or reading head 9 in a direction TD substantially parallel to a bundle 2. In order to obtain a tracking signal between the writing and/or reading head 9 and the information storage medium 1 at least the central servo track 3 (not shown) of a bundle 2 is read. The tracking signal gives an indication on whether the reading part of head 9 is properly aligned on the central track 3. In a step 10 the central servo track 3 of a basic tracking unit T(N), e.g. the basic tracking unit shown in FIG. 2, is read over the whole length LT using a reading part of the head 9 (not shown) dedicated to the central servo track 3. A reading signal S3 is obtained and subsequently integrated in a step 11. An integration result I3 is proportional to a size SC of the surface presenting the first characteristic 6 in the central servo track when the dedicated reading part of the head 9 is aligned on the central servo track 3. In the case where the head 9 is transversely offset in a first direction, e.g. in direction of the side servo track 4, the side servo track 4 contributes to the reading signal S3. An integration result I34 accordingly has a value which is smaller than I3, because a size SS4 of the surface presenting the first characteristic 6 in the side servo track 4 is smaller than SC. In the same manner an integration result I35 obtained when the head 9 is transversely offset in a second direction towards the side servo track 5, thus in a direction opposite to the first direction, will be greater than I3. This is due to a size SS5 of the surface presenting the first characteristic in the side servo track 5, which is greater than SC. It is thus possible in a step 12 to compare the integration result to I3, which is a reference value, to obtain a tracking signal 13. The tracking signal 13 indicates in which direction the head 9 is transversely offset.

In some configurations of information storage media it is useful to store information in a DC-free format; this means that a mean signal resulting from reading such information will be free of a continuous Direct Current component i.e. have the value 0.

Figure 4:
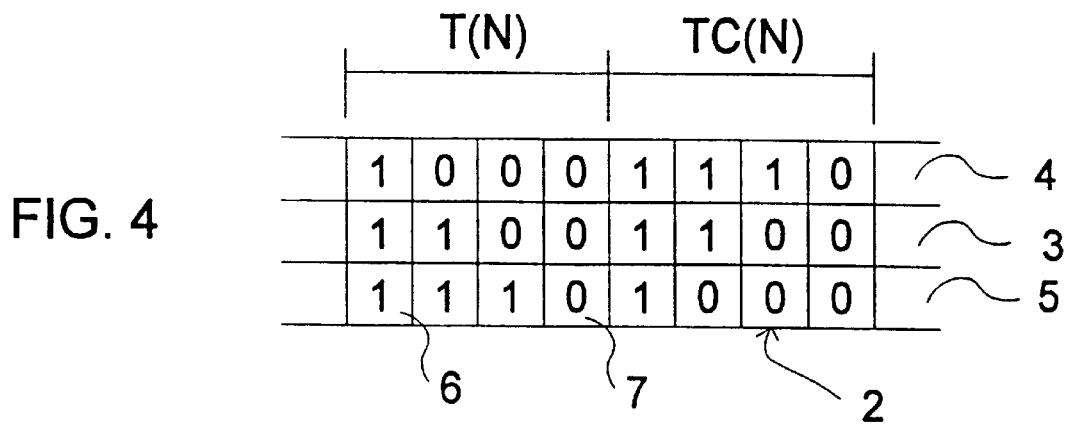
FIG. 4 contains a schematic representation of a basic tracking unit and a complementary tracking unit in which are represented high and low tracking bits.

FIG. 4 shows a schematical representation of a single basic tracking unit T(N) and a complementary tracking unit TC(N) which are part of a bundle 2. The surfaces presenting said first characteristic 6 or said second characteristic 7 represent high or low tracking bits respectively. A high or low tracking bit occupies a tracking bit surface having a predetermined size. This way the size of a surface presenting either the first or the second characteristic is a multiple of the size of a tracking bit surface. In FIG. 4 a tracking bit surface of a high or low tracking bit is represented by a square containing a "1" or a "0". In each servo track 3, 4 or 5 inside TC(N) the number of low tracking bits is the same as the number of high tracking bits inside T(N). In other words in each servo track 3, 4 or 5 inside TC(N) the size of the surface presenting the second characteristic 7 is the same as the size of the surface presenting the first characteristic 6 inside T(N). The DC-free format used in the consecutive tracking units T(N) and TC(N) results in a DC-free signal for each servo track 3, 4 or 5 when these tracks are read.

In order to obtain a tracking signal when using a bundle 2 with basic tracking units T(N) and complementary tracking units TC(N) as shown in FIG. 4, the central track 3 is read using a dedicated part of a reading head as shown in FIG. 3. The reading signal obtained from T(N) is processed as described for FIG. 3. The reading signal obtained from TC(N) is integrated over the length LT of TC(N) and the integration result is subtracted from a predetermined maximum value to obtain a processed integration result. The predetermined maximum value may for example be obtained by integrating a reading signal from a tracking unit in which the central servo track contains only high tracking bits (tracking unit not shown in FIG. 4). The processed integration result is compared to a reference value, which may for example be I3, to obtain a tracking signal.

A bundle 2 may for example only contain basic and complementary tracking units inside which the number of high tracking bits in the central servo tracks is constant e.g. 2 high tracking bits. This way the reference value I3 remains the same for all tracking units in the bundle.

Figure 5:
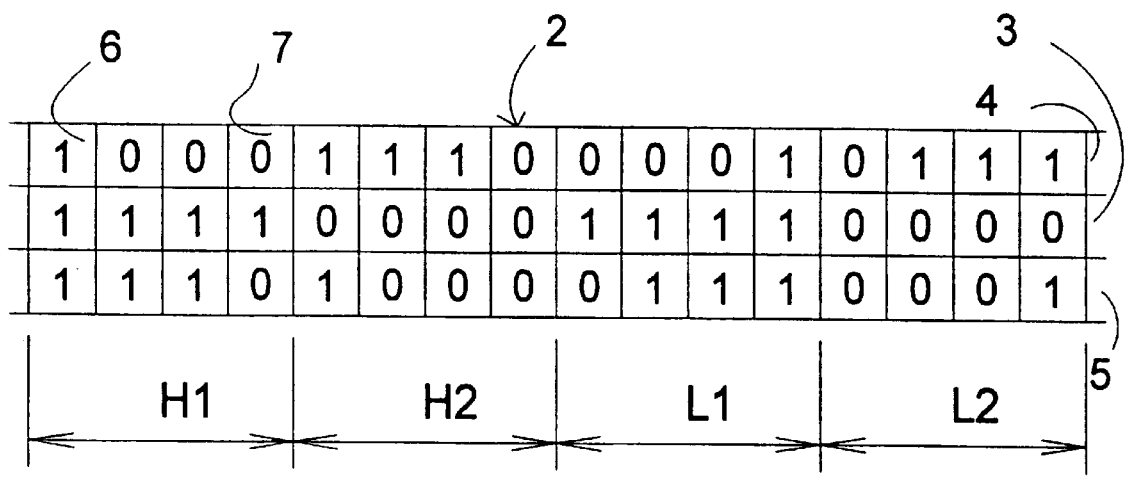
FIG. 5 contains a schematic representation of servo bits.

FIG. 5 shows another embodiment of a basic tracking unit H1 contained in a bundle 2. An overall surface in each servo track 3,4 or 5 respectively may contain four tracking bit surfaces. Inside the basic tracking unit H1, the central servo track 3 has four high tracking bits, the side servo tracks 4 and 5 have one and three high tracking bits respectively. This way the size of the surface presenting the first characteristic 6 in the side servo track 4 is smaller than half of the size of the overall surface in the side servo track 4, i.e. the size of two tracking bit surfaces. In the side servo track 5 the size of the surface presenting the first characteristic 6 is larger than the size of two tracking bits surfaces. The basic tracking unit H1 is immediately followed by a complementary tracking unit H2. Inside the complementary tracking unit H2 the number of low tracking bits in each servo track is the same as the number of high tracking bits in the corresponding track inside the preceding basic tracking unit H1. Following the complementary tracking unit H2 in the bundle 2 is a further basic tracking unit L1. The number of high tracking bits in each servo track 3,4 or 5 inside L1 is the same as in the corresponding servo tracks inside H1. A distribution of the tracking bit surfaces representing high tracking bits in the side servo tracks 4 and 5 is different between H1 and L1. For example the distribution inside H1 in the side servo track 4 may be represented by a binary number 1000 whereas it is 0001 inside L1. L1 is immediately followed by a complementary tracking unit L2 in the bundle 2. The pairs (H1, H2) and (L1, L2) constitute respectively a high and a low servo bit which are distinguishable from each other by the specific distribution inside the tracking units of the tracking bit surfaces representing high tracking bits. The information contained in each track of the high and low servo bits has a DC-free format.

Figure 6:
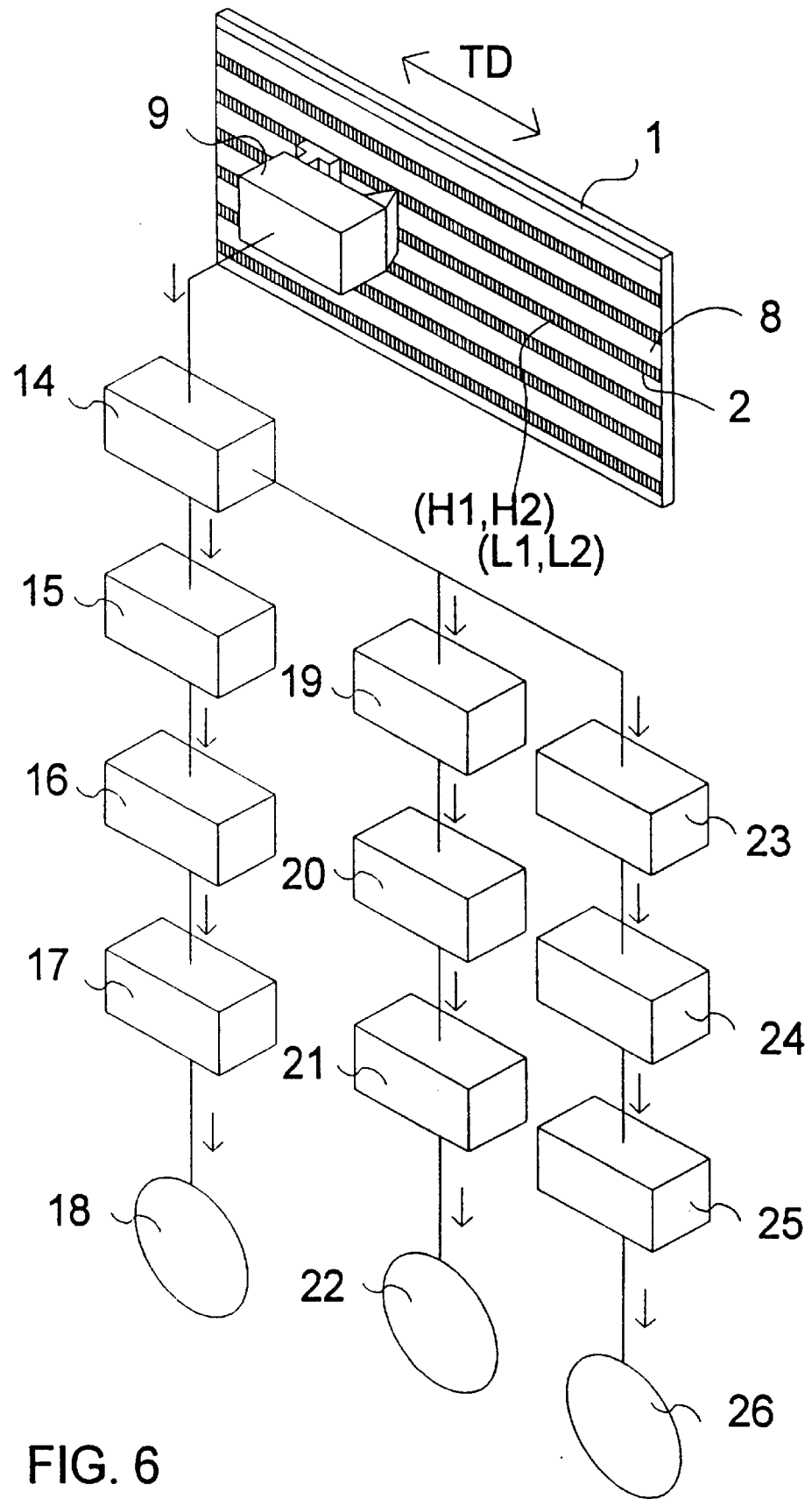
FIG. 6 contains a schematic representation of steps executed in a further method for obtaining a tracking signal.

FIG. 6 shows an information storage medium 1 which has a multiplicity of longitudinal bundles 2. The bundles are arranged in pairs of basic and complementary tracking units, e.g. (H1, H2) and (L1, L2) as shown in FIG. 5. Spaces 8 between the bundles 2 may be occupied by data. In order to obtain a tracking signal between a writing and/or reading head 9 and the information storage medium 1 the servo tracks 3, 4 and 5 of a bundle 2 are read. The reading is done using three reading parts (not shown) of the head 9, each reading part being dedicated to one servo track. The reading parts are adjacent to each other and aligned transversely to the bundle. In a step 14 the reading parts deliver reading signals R3, R4 and R5 for the servo tracks 3, 4 and 5 which are added to obtain a total signal RT in step 15. In a step 16 the total signal RT is integrated over a basic tracking unit (H1 or L1) to obtain an integration value IB and over the immediately following complementary tracking unit (H2 or L2) to obtain an integration value IC. The integration values are substracted from each other to obtain an integration result IT=IB−IC. In a step 17 the integration result IT is compared to a reference value to determine a possible offset of the head 9 and a direction of the possible offset. For example when using pairs (H1, H2) and/or (L1, L2), IT<0 indicates a transversal offset of the head 9 in direction of the side servo track 5, the reference value being 0. Accordingly a tracking signal 18 is generated which gives an indication of a possible transverse offset of the head 9 and its direction pointing to either the side servo track 4 or 5.

As mentioned above the pairs (H1, H2) and (L1, L2) constitute respectively a high and a low servo bit. These may be recognized in steps 19 and 20. In the step 19 the reading signals R4 and R5 are compared to predetermined signals which each are specific to a servo bit. For example if on reading a basic and a complementary tracking unit the reading signals R4 and R5 match the binary numbers 10001110 and 11101000 identifying the high servo bit then a high servo bit is recognized in step 20. In the same manner reading signals R4 and R5 matching the binary numbers 00010111 and 01110001 lead to the recognition of a low servo bit. The recognized high and low servo bits are processed in a step 21 and depending on a coding using those servo bits (including perhaps error correction code) identification information 22 is decoded and recovered. The identification information 22 may for example relate to information stored adjacent to the bundle 2 in the space 8. More precisely the identification information 22 may be a number of a music piece stored in the space 8.

Each servo bit (H1, H2) and (L1, L2) also contains longitudinal position information which can be used to find a relative longitudinal position in the bundle 2. In a step 23 the reading signal from the central servo track 3 is used to obtain an individual phase signal. The individual phase signal corresponds to a periodical 11110000 sequence. In some cases, for example when at least one high tracking bit in each track inside the tracking unit occurs at a same longitudinal delimitation of the tracking unit, it is useful to process individual phase signals from each servo track in a step 24 to obtain a total phase signal. The total phase signal or even a single individual phase signal may be monitored and used to count the number of tracking units that have been read in a step 25. The number of tracking units read allows to determine a longitudinal position information 26 relating to a position of the reading head relative to a first tracking unit read. A more precise analysis of the individual or total phase signal may also allow to determine a precise longitudinal position of the reading head inside a tracking unit and accordingly a trigger signal may be obtained which corresponds to e.g. a longitudinal delimitation of the tracking unit.

Figure 7:
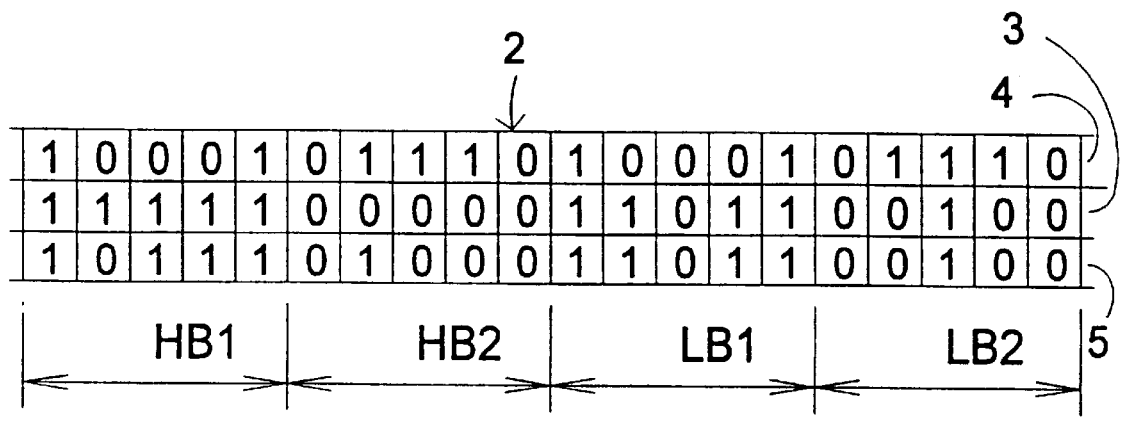
FIG. 7 contains a schematic representation of further servo bits.

FIG. 7 shows another example of a high servo bit (HB1, HB2) and a low servo bit (LB1, LB2). To obtain a tracking signal the method described above and illustrated in FIG. 6 may be used. The recognition of high and low servo bits in steps 19 and 20 is obtained by comparing the reading signal R3 from reading the central servo track 3 with predetermined signals. The predetermined signals corresponding to binary numbers 1111100000 and 1101100100 respectively identify a high or a low servo bit. More precisely, the numbers of high tracking bits in the central servo track 3 of the basic tracking units HB1 tracking and LB1 are different, making it possible to distinguish (HB1, HB2) from (LB1, LB2).

The total phase signal in step 24 is processed from three individual phase signals from step 23 which are obtained on reading all three servo tracks 3, 4 and 5. In the case that all individual phase signals simultaneously correspond to a low tracking bit immediately followed by a high tracking bit, the total phase signal corresponds to a longitudinal delimitation of a basic tracking unit. In the opposite case where the individual phase signals simultaneously correspond to a high tracking bit immediately followed by a low tracking bit the total phase signal indicates a longitudinal delimitation of a complementary tracking unit inside of a servo bit.

The basic and complementary tracking units described above in this specification are special examples. More generally many types of methods may be applied to obtain further tracking units with different combination of tracking bits, i.e. with different tracking codes.

Figures 8, 9:
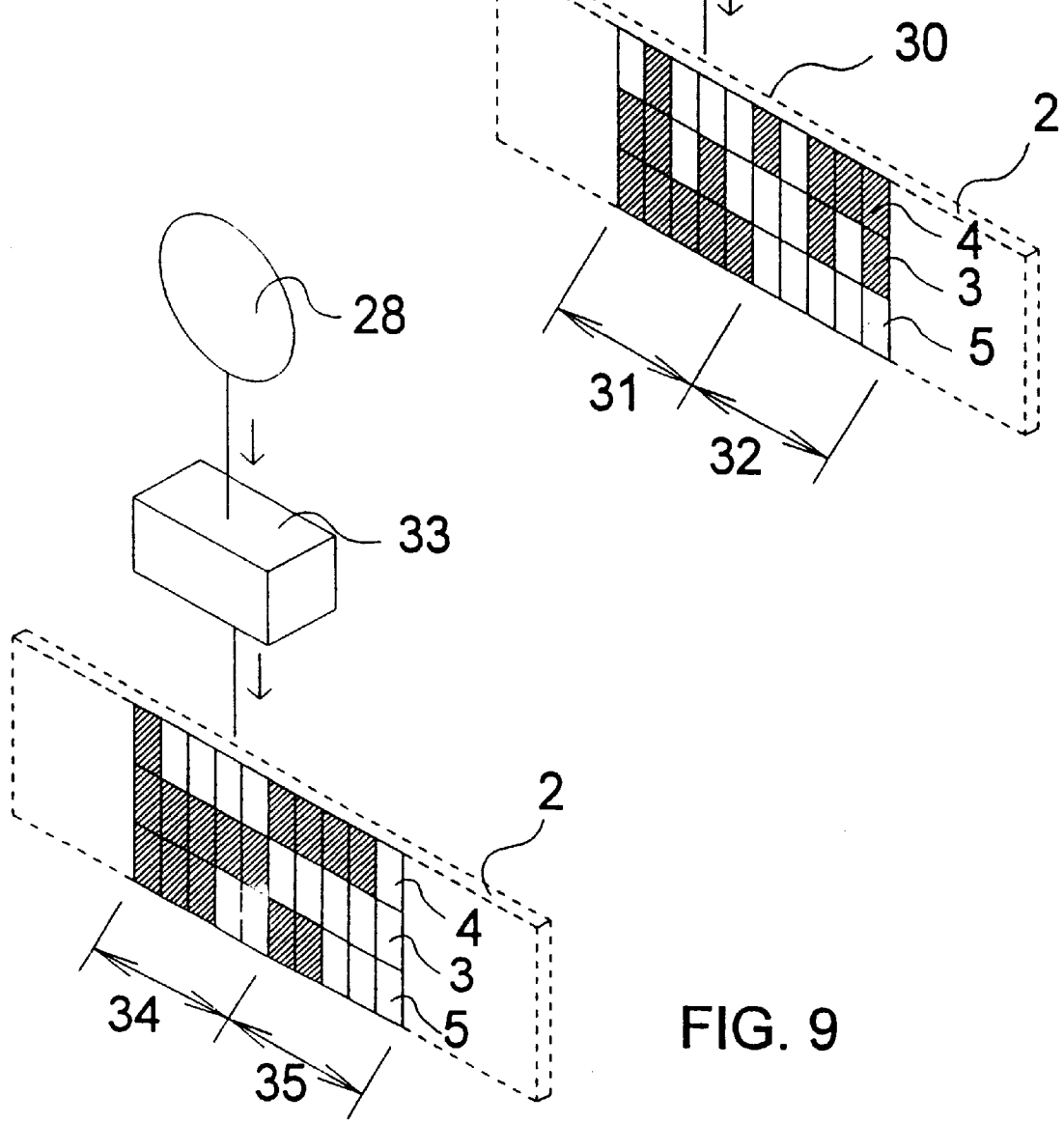
FIG. 8 contains a schematic representation of steps undertaken in a method for obtaining a tracking code combining a transversal tracking code with distinct information.
FIG. 9 contains a schematic representation of steps undertaken in another method for obtaining a tracking code combining a transversal tracking code with distinct information.

A first type of method is schematically represented in FIG. 8. The first type of method allows to combine a transversal tracking code with distinct information. The transversal tracking code is a feature which enables to determine whether a writing and/or reading head is transversely offset from servo tracks which contain the transversal tracking code. The distinct information may be identification information, longitudinal position information or both together. The first type of method is used for example to generate servo bits having a total longitudinal length of 10 tracking bits. A central binary data codeword 27 having three high tracking bits (shown using hatched surfaces) is selected. The number of high tracking bits is predetermined and should be greater than 1 and smaller than 5. The central binary data codeword 27 corresponds to the binary number 11010 but it could have been any other binary number with 5 tracking bits wherefrom 3 correspond to high tracking bits. The central binary data codeword 27 is combined with distinct information 28 in a step 29 to obtain servo bits, an example of which is shown as servo bit 30. The servo bit 30 consists of a basic tracking unit 31 and a complementary tracking unit 32. The tracking units 31 and 32 are part of a longitudinal bundle 2 shown partly is dotted lines and which is part of an information storage medium (not shown). The central servo track 3 contains the central binary data codeword 27 inside the basic tracking unit 31 and a binary codeword having the predetermined number of low tracking bits inside the complementary tracking unit 32. The side servo tracks 4 and 5 may contain inside the basic tracking unit 31 a binary codeword having a number of high tracking bits respectively smaller or greater than the predetermined number, e.g. 01000 and 11111. A choice of the latter binary codewords determines a distinctive characteristic of the basic tracking unit, thus allows for example to create high and low servo bits to code the distinct information 28. Inside the complementary tracking unit 32 the binary codewords are chosen such to obtain a DC-free format.

The complementary tracking unit generated in this first type of method may be left out in a further embodiment of the method. In this case the bundle 2 will be arranged in basic tracking units only.

FIG. 9 schematically illustrates a second type of method used to obtain tracking units. The distinct information 28 is coded by combining any special binary data codeword (e.g.11111) to be stored in the central servo track 3 of a basic tracking unit 34 with binary data codewords having a number of high tracking bits respectively smaller than 3 (e.g.10000) or greater than 2 (e.g.11100). The latter binary data codewords are stored in the side servo tracks 4 and 5 inside the basic traking unit 34. The complementary tracking unit 35 contains binary data codewords in the servo tracks which are chosen to obtain a DC-free format in the servo bit (34,35).

What is claimed is:

1. An information storage medium having at least a longitudinal bundle comprising a central servo track positioned between two contiguous side servo tracks, said bundle being arranged in tracking units of a determined longitudinal length, each of said servo tracks having a surface presenting, at a given longitudinal position, one of a first characteristic and a distinct second characteristic, wherein said tracking units comprise at least one basic tracking unit immediately followed by a complementary tracking unit in a longitudinal direction, and inside each basic tracking unit a size of the surface presenting said first characteristic is smaller in one of said side servo tracks than a size of the surface presenting said first characteristic in said central servo track, and in the other side servo track a size of the surface presenting said first characteristic larger than said size of the surface presenting said first characteristic in said central servo track, and each of said servo tracks inside said complementary tracking unit has a size of the surface presenting said second characteristic substantially equal to the size of the surface presenting said first characteristic inside the preceding basic tracking unit.

2. An information storage medium according to claim 1 wherein for at least one of said servo tracks the size of the surface presenting said first characteristic inside one of said basic tracking units is substantially the same for all of said basic and complementary tracking units.

3. An information storage medium according to claim 1 wherein said bundle of servo tracks has longitudinally stored identification information which is represented by servo bits, each servo bit being one of a basic tracking unit, a complementary tracking unit and a combination thereof, said servo bit having a specific distribution of the surface presenting said first characteristic in at least one of said servo tracks, said specific distribution configured to distinguish said servo bits from each other.

4. An information medium according to claim 1, wherein said bundle of servo tracks has longitudinally stored identification information which is represented by servo bits, each servo bit being one of a basic tracking unit, a complementary tracking unit and a combination thereof, said servo bit having, at least in one servo track a distinctive size of the surface presenting said first characteristic, said distinctive size configured to distinguish the servo bits from each other.

5. An information storage medium according to claim 1 wherein high and low tracking bits represent the surfaces presenting said first and second characteristics respectively, and that the size of said surfaces presenting said first or said second characteristic in each of said servo tracks is a multiple of a size of a tracking bit surface.

* * * * *